US010955266B2

(12) United States Patent
Benner, Jr. et al.

(10) Patent No.: US 10,955,266 B2
(45) Date of Patent: *Mar. 23, 2021

(54) LIGHT DETECTOR EMPLOYING TRAPEZOIDAL CHIPS

(71) Applicant: Pangolin Laser Systems, Inc., Orlando, FL (US)

(72) Inventors: William R. Benner, Jr., Sorrento, FL (US); Ryan Smith, DeBary, FL (US); Ante Uglesic, Ljubjana (SI)

(73) Assignee: Pangolin Laser Systems, Inc., Sanford, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,793

(22) Filed: Dec. 17, 2019

(65) Prior Publication Data

US 2020/0124446 A1   Apr. 23, 2020

Related U.S. Application Data

(63) Continuation of application No. 15/239,438, filed on Aug. 17, 2016, now Pat. No. 10,539,433.

(60) Provisional application No. 62/205,828, filed on Aug. 17, 2015.

(51) Int. Cl.
 *G01D 5/347* (2006.01)
 *G01D 5/14* (2006.01)

(52) U.S. Cl.
 CPC ............. *G01D 5/347* (2013.01); *G01D 5/142* (2013.01)

(58) Field of Classification Search
 CPC .............. G01D 5/347; G01D 5/34707; G01D 5/34715; G01D 5/3473; G01D 5/142
 See application file for complete search history.

(56) References Cited

U.S. PATENT DOCUMENTS

| | | | | |
|---|---|---|---|---|
| 5,545,291 A * | 8/1996 | Smith | ................... | G02F 1/1362 257/E21.505 |
| 5,744,856 A * | 4/1998 | Rostoker | ............. | H01L 29/0657 257/618 |
| 5,844,673 A * | 12/1998 | Ivers | .................. | G01D 5/34715 356/138 |
| 6,218,803 B1 * | 4/2001 | Montagu | .............. | G01D 5/2405 318/652 |
| 7,688,432 B1 * | 3/2010 | Benner, Jr. | ............. | G01D 5/342 356/138 |
| 7,820,956 B2 * | 10/2010 | Sidor | ..................... | G01D 3/036 250/231.13 |
| 7,940,380 B1 * | 5/2011 | Benner, Jr. | ........... | G01D 5/3473 356/138 |
| 8,508,726 B2 * | 8/2013 | Benner, Jr. | ........... | G01D 5/3473 356/138 |
| 8,809,763 B1 * | 8/2014 | Stutz | .................... | G01D 5/3473 250/231.1 |
| 9,097,561 B2 * | 8/2015 | Sato | .................... | G01D 5/34715 |
| 10,539,433 B2 * | 1/2020 | Benner, Jr. | ........... | G02B 26/105 |
| 2008/0013106 A1 * | 1/2008 | Sidor | ..................... | G01D 3/036 356/622 |

(Continued)

*Primary Examiner* — John R Lee

(74) *Attorney, Agent, or Firm* — Stephen G. Anderson; Greenberg Traurig, P.A.

(57) ABSTRACT

A position sensor employing silicon photodiodes formed from trapezoidal chips mounted on a printed circuit board detects angular positions of a rotor shaft within a galvanometer-based optical scanner.

11 Claims, 5 Drawing Sheets

(56) References Cited

U.S. PATENT DOCUMENTS

2009/0155989 A1* 6/2009 Uematsu ................ C30B 25/18
                                                                438/507
2018/0375416 A1   12/2018 Loussert et al.
2019/0271574 A1*  9/2019 Benner, Jr. ............ G01D 5/342

* cited by examiner

LIGHT DETECTOR EMPLOYING TRAPEZOIDAL CHIPS

CROSS-REFERENCE TO RELATED APPLICATIONS

This application is a continuation of, and claims the benefit of and priority to, U.S. patent application Ser. No. 15/239,438, filed Aug. 17, 2016, which itself claims priority to U.S. Provisional Application Ser. No. 62/205,828, filed Aug. 17, 2015, the disclosures of which are hereby incorporated by reference in their entirety and all commonly owned.

FIELD OF THE INVENTION

The present invention is generally related to trapezoidal chips having silicon photodiodes, and in particular to a position sensor employing silicon photodiodes mounted on a printed circuit board (PCB) for detecting angular positions of a rotor shaft within a galvanometer-based optical scanner.

BACKGROUND

Rotary position detectors have many uses, such as detecting the position of the shaft on a motor, for the purpose of electrical commutation. Another such use is to detect the position of a tensioner pulley in a magnetic tape player or web-type printing press, for the purpose of maintaining a constant tension on the tape or paper. One of the more recent uses of a rotary position detector is to sense the position of the accelerator (gas) pedal in an automobile that uses electric motors as a partial or complete means of driving the wheels.

Galvanometer-based optical scanners are used to direct non-moving input light beams to a target area. This type of scanner uses a limited-rotation motor to impart rotational motion onto an optical element, such as a mirror. Normally the mirror is mounted directly on the output shaft of the motor. A position detector is included within the motor, either close to the output shaft, or on the "rear" portion of the motor. This position detector normally outputs a current or voltage signal that is proportional to the relative angle of the motor shaft, and thus, relative to the angle of the mirror with respect to the non-moving input light beam.

Galvanometer-based optical scanners direct a laser beam for marking, cutting, or display purposes, for which positioning accuracy and repeatability can be of critical importance. Therefore, one of the limiting factors of accuracy and repeatability is the performance of the position detector used with the optical scanner.

Ideally, a rotary position detector should only be sensitive to the rotational angle of the scanner shaft. Since a mirror is connected directly to the scanner shaft, it is the rotation angle of the shaft that dictates the direction of the exiting light beam. Axial motion and radial motion generally will not affect the target position of the light beam being reflected by the mirror, and since it is the target light beam position that is important to the scanning system, the output of the position detector should indicate the target position, and be insensitive to things that do not affect that target position, such as axial and radial motion. Axial shaft motion may occur as a dynamic behavior of the scanner. For example, if the magnetic construction of the scanner is not perfect, the shaft may surge outward or inward when strong current pulses are put into the scanner during strong acceleration and deceleration. Radial motion of the scanner can occur as a result of bearing "rumble" or imperfections in manufacturing, which allow a small amount of radial motion of the shaft. Radial shaft motion can also occur as a dynamic effect, if the rotor is not perfectly concentric with the stator components, or if the inertial load (mirror and mount) attached to the output shaft is not perfectly balanced.

A servo controller is connected between the position detector and the motor. If the position detector produces some output as a result of axial or radial shaft motion, the servo controller will mistakenly interpret this errant output as a change in rotational position, resulting in a positioning error of the overall system. For that reason, a perfect rotary position detector will produce an output only as the result of rotational motion, and will not produce an output as the result of axial or radial motion.

An additional desirable property of a rotary position detector, especially for galvanometer scanners used with analog servo systems, includes the feature that the output voltage or current be linear with respect to the rotation angle. That is to say, an incremental change in shaft rotation should produce an equally incremental change in output signal from the position detector, although a small degree of nonlinearity is often tolerable. Further, the signal-to-noise ratio should be as high as possible.

There are several ways to sense the position of the shaft within an optical scanner. Two popular types of position detectors comprise capacitive position detectors and optical position detectors.

Capacitive position detectors were used in some of the very earliest galvanometer-based optical scanners. In one known detector, a rotating dielectric butterfly is connected to the scanner shaft, and the detection plates are fixed.

Optical position detectors have emerged recently as the position detector of choice in the field of galvanometer-based optical scanning. Typically, optical position detectors can be made small, and have low inertia, and can be manufactured at low cost. These properties make optical position detectors desirable for optical scanners applied in commercial and consumer markets.

One type of optical position detectors is a "shadow cast" position detector, wherein a large area of light sensor material is attempted to be evenly illuminated, and a shadow is cast on the light sensors by a light blocker. Optical position detectors can use photocells as the light sensors. These photocells are most commonly bulk-area PIN photodiodes, and are used in the "photovoltaic" mode, whereby an electrical current is produced by the photocell, and amplified by an op-amp. The amount of electrical current increases linearly as the intensity of the light over the entire area of the photocell increases linearly. The amount of electrical current also increases linearly as the illuminated portion of the photocell is linearly increased, as long as the illumination across the entire area is constant. That is, if light is illuminating half the light sensor area, and light is blocked from the other half of the light sensor area, the electrical current that is output will be half the amount as of that for a complete illumination of the light sensor, yielding a linear relation of position detector output to photocell area illumination.

Regardless of the type of position detector used, capacitive or optical, all known position detectors are believed to suffer from one common problem: They all output a signal that is indicative of relative shaft rotation, but they do not output a signal that is indicative of absolute shaft rotation. That is to say, it is impossible for the servo controller to read the position signal voltage or current, and know the precise mechanical angle of the shaft, in absolute terms. This is because the output from the photocells or the capacitive plates is proportional to the light produced by the LED or the signal produced by the oscillator, respectively. In the case of the optical position detectors, if the light from the LED increases due to environmental changes, or due to component drift, the output produced by the photocells will increase proportionally. This proportional increase will fool the servo into believing that the shaft has been rotated to a greater mechanical angle. The servo will then try to compensate for this, and generate an error.

All known position detectors attempt to correct for this by using an automatic gain control (AGC) circuit such as known in the art. In the case of the optical position detectors, the light received by all photocells are added together, to form a "total light" signal voltage. This "total light" voltage is compared to a reference voltage, and an error signal is produced that drives the LED. If the "total light" is sensed to have increased, then the light output by the LED is made to decrease by a corresponding amount, thus trying to maintain the sensitivity of the position detector over time. However, the use of AGC is only good enough to correct first-order problems. All known position detectors suffer from position offset drift (a change in what the position detector believes is the "absolute zero" degree position of the shaft) and position scale drift (a change in what the position detector indicates in terms of volts per degree) due to second-order effects, such as drift of the reference voltage itself, or change of the feedback resistors used in the op-amp circuits. These changes occur with time and temperature.

In the past, attempts have been made to provide additional signals to rotational position detectors that are indicative of certain absolute positions. On an elective or automatic basis, the servo can exercise the galvanometer scanner in search of these additional signals, and thus become aware of the absolute position scale and position offset of the position detector. When implemented in a capacitive position detector, this technique has several parasitic problems. First, capacitive position detectors are very sensitive to the shape of the plate members. Plates with protrusions or notches will have an impacted linearity due to fringe effects that happen as a result of the protrusions or notches. Fringe effects will also impact linearity if additional capacitive plates are used. The specially shaped moving butterfly is more expensive to manufacture, whether this technique is used with an optical position detector or with a capacitive position detector. The dominant servo used to control galvanometer-based optical scanners has been the PID servo system made entirely with analog components (analog servos). Analog servo systems have been used because they are relatively inexpensive and relatively simple, and also because up until now, digital servo systems could not achieve the high resolution and high sample rate necessary to be usable with the fastest galvanometer scanners. In order to support the fastest galvanometer scanners currently on the market, and achieve step times in the sub-100-microsecond range, a sample rate of 200 kHz must be used, along with a sampling resolution of 16 bits. And because of the multiple internal calculation steps needed, floating point calculations are highly desirable. Until recently, it was cost-prohibitive to implement a servo controller in a digital form with this high sample rate and resolution. However, with the constant progress that inevitably occurs in technological fields, digital signal processors (DSPs) and analog to digital (ND) converters are now becoming available with sufficient speed and at a reasonable cost, which will help cause a shift from analog servos to DSP-based servos for use with galvanometer scanners.

Analog servos typically have a relatively large number of potentiometers used to "tune" the servo for optimal performance. These potentiometers adjust a number of servo parameters including servo gain, damping, notch filter frequency, notch filter depth, input gain, input offset, etc. There are typically also two additional potentiometers to adjust the position scale and position offset of the position detector. Although these last two are not servo parameters in the strictest sense, they certainly do affect servo performance and accuracy. All these potentiometers must be manually adjusted, or "tuned," by humans. Typically this tuning is done at the factory, but sometimes further tuning is required in the field. Because engineers may not be the end-users of systems with galvanometer scanners, any non-factory tuning can result in sub-optimal operation.

The shift towards DSP-based servo systems will obviate the need for all these adjustment potentiometers, because servo parameters such as servo gain, damping, notch filter frequency, etc. will all be set by algorithmic constants. These algorithmic constants can be manually "tuned" by humans, in a similar way that resulted in the potentiometer adjustments, only using a user interface to make the adjustments, or alternatively these algorithmic constants may be tuned automatically, by some intelligent tuning algorithm. This is possible because almost all the information about the scanning system can be gleaned merely by exercising the scanner and observing what happens with the position signal. For example, the torque constant of the scanner can be derived by observing the back-EMF of the scanner. Stated in mechanical engineering terms KT=KE. That is, dyne centimeters of torque per amp is directly proportional to motor back-emf volts per degree per second. Thus, if the servo creates scanner motion, and can measure the "degrees per second" and the motor back emf, then the servo can derive the precise torque constant (KT) of the scanner.

Once the KT is known, the servo could next apply a pulse of known current for a short time, and measure the angular acceleration that results, and thus the servo can glean the system inertia (J) of the rotor, mirror, and position detector, since force equals mass times acceleration. Therefore, inertia equals KT divided by acceleration.

Next, the servo could wrap a light loop around the scanner and perform a Bode plot, thus revealing all system resonances. With this information, the servo could set all constants for the poles and zeros of notch and bi-quad filters.

Once the torque constant, system inertia, and system resonances are all known, all servo parameters could be easily set in a matter of seconds, with digital precision, achieving the absolute maximum performance from the scanner and servo system. But in order for all this to happen, the servo system needs one fundamental piece of information. The servo must know the "position scale." That is, the servo must first know the volts per degree from the position detector.

Position sensors used in optical scanning systems are generally well known, as described by way of example in U.S. Pat. Nos. 7,688,432; 7,940,380 and; 8,508,726, the disclosures of which are herein incorporated by reference in their entirety and commonly owned.

Yet further, as described in U.S. Pat. No. 5,844,673, the disclosure of which is herein incorporated by reference in its entirety, a typical square chip approach is currently very common.

However, it would be beneficial to provide a rotary position detector having improved signal-to-noise ratio and also provide absolute position accuracy.

SUMMARY

Embodiments of the present disclosure include an improved light detector, or position sensor, employing silicon photodiodes formed from trapezoidal chips mounted on a printed circuit board for detecting angular positions of a rotor within a galvanometer-based optical scanner. The light detector is operable with, for example, a rotary position detector for determining the rotational position of an associated shaft or other device.

The current invention is directed to an optical position detector and provides embodiments that include low inertia operation and can be used with small optical scanners. Moreover, embodiments of the invention provide improved signal-to-noise ratio and may optionally provide absolute position accuracy.

A rotary position detector is provided herein that may comprise a housing having an inner space defined by an inner wall. A light source is positioned to emit light rays into the housing's inner space from a bottom thereof. A base is positioned within the housing's inner space.

A light detector assembly is positioned within the housing's inner space and comprises a first number of light sensors positioned on the base and disposed in pairs about an axis of a motor shaft. Each pair comprises one "A" detector element and one "B" detector element. The pairs are disposed so that each "A" detector is circumferentially positioned between two "B" detectors and each "B" detector is positioned between two "A" detectors. The term "light sensor" herein is intended to connote a region of light-sensitive material.

A light blocker is affixed within the housing's inner space for rotation with the motor shaft above the light source, essentially between the light source and the light detector assembly. The light blocker may comprise a second number of opaque, substantially equal-surface-area elements arrayed about the motor shaft axis. The second number is equal to one-half of the first number. Thus the light rays emanating from the light source that not blocked by the light blocker will reach light detector assembly, and light rays that are blocked by the light blocker are not received by the light detector assembly.

A signal connection is provided between the light detector elements and a circuit for measuring a signal from the "A" detectors and the "B" detectors relating to an amount of light falling thereon. A difference between the "A" detector signal and the "B" detector signal is related to an angular position of the motor shaft.

BRIEF DESCRIPTION OF THE DRAWINGS

Embodiments of the invention are described by way of example with reference to the accompanying drawings in which.

DETAILED DESCRIPTION OF EMBODIMENTS

Embodiments of the present invention will now be described more fully hereinafter with reference to the accompanying drawings, in which embodiments of the invention are shown by way of illustration and example. The invention may, however, be embodied in many forms and should not be construed as limited to the embodiments set forth herein. Rather, these embodiments are provided so that this disclosure will be thorough and complete, and will fully convey the scope of the invention to those skilled in the art.

Figure 1:
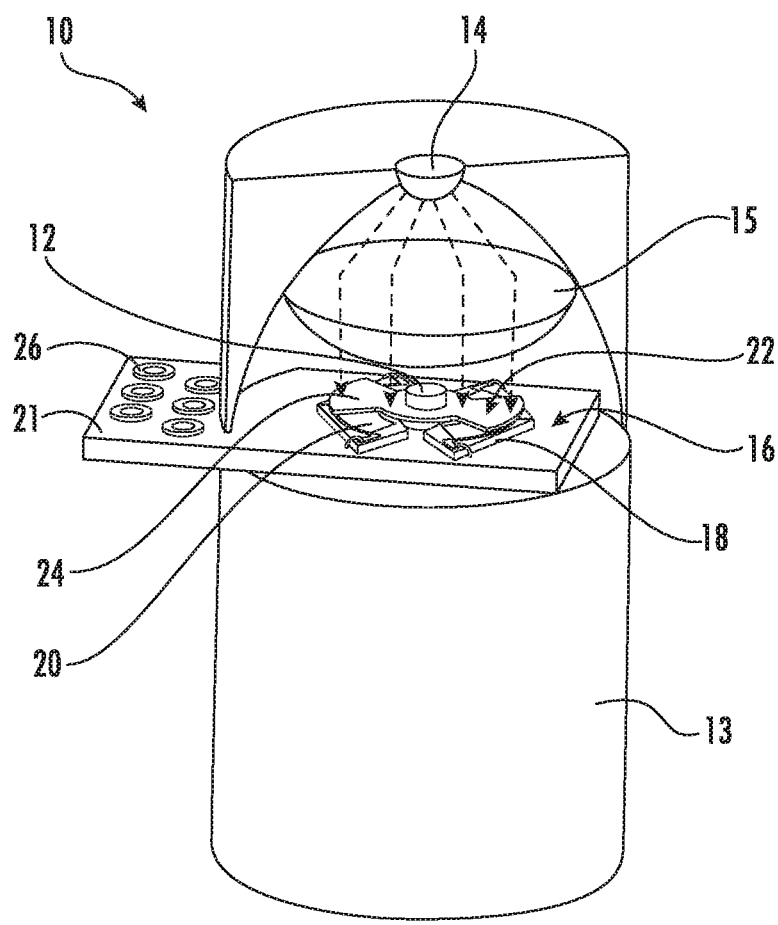
FIG. 1 is a perspective view of a rotary position detector operable with silicon photodiodes on a PCB according to the teachings of the present disclosure.

With reference initially to FIG. 1, an embodiment includes a rotary position detector 10 comprising a shaft 12 rotatable about an axis thereof and a light source 14. The light source 14 may comprise a unitary light source generally aligned with the axis. Certain embodiments of the rotary position detector 10 may include a housing 13, although other suitable configurations are within the scope of the present disclosure. Light rays emanating from the light source 14 may optionally be modified by a lens 15 or other light modifying or directing element. A light detector 16 is positioned in a spaced relation to the light source 14 for receiving the light rays. Embodiments may also include a motor (not shown) operable with the shaft 12.

A light blocker 22 is positioned between the light detector 16 and the light source 14, the light blocker 22 having at least one element 24 rotatable with the shaft 12. The light blocker 22 may be attached to the shaft 12, and hovers over the surface of the light sensors 20, such as, for example, silicon photodiodes. The light blocker 22 may be butterfly shaped, having two opaque wings, which partially cover or uncover the photosensitive areas.

As the shaft 12 rotates, the light blocker 22 will expose a greater amount or lesser amount of photosensitive area on the light detector's light sensor 20, thereby permitting a determination of the relative position of the shaft 12. One embodiment, described by way of example, includes four photosensitive areas that produce output as the light blocker 22 uncovers or covers the active areas. A signal connection 26 to the light detector 16 may also be provided for measuring the output corresponding to an amount of light impinging on the at least one light sensor 20 to thus measure a rotary position of the shaft 12.

Figure 2:
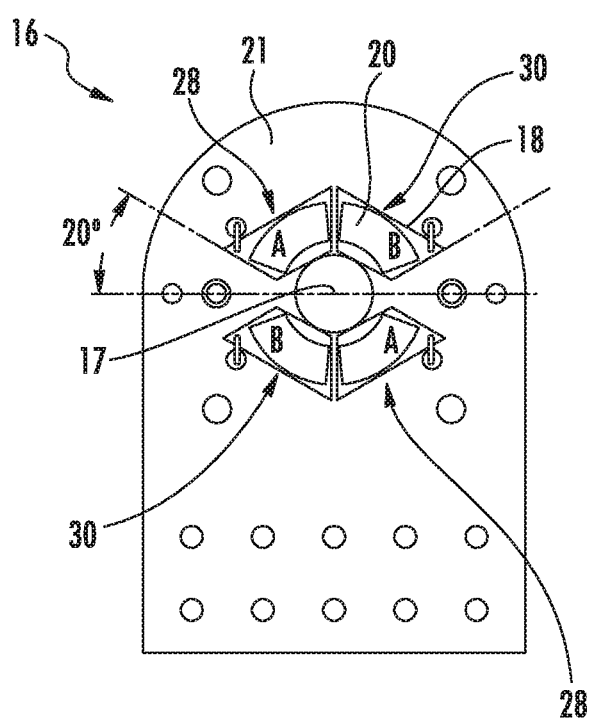
FIG. 2 is a diagrammatical plan view of one embodiment of a light detector comprising a PCB-mounted trapezoidal chip having a photodiode light sensor according to the teachings of the present disclosure.
Figure 3:
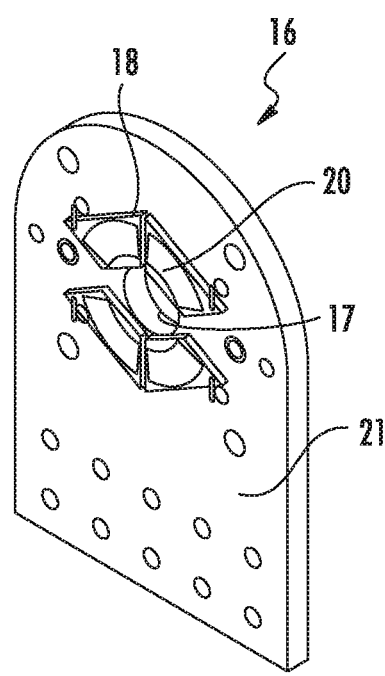
FIG. 3 is a perspective view of the embodiment of FIG. 2.
Figure 4C:
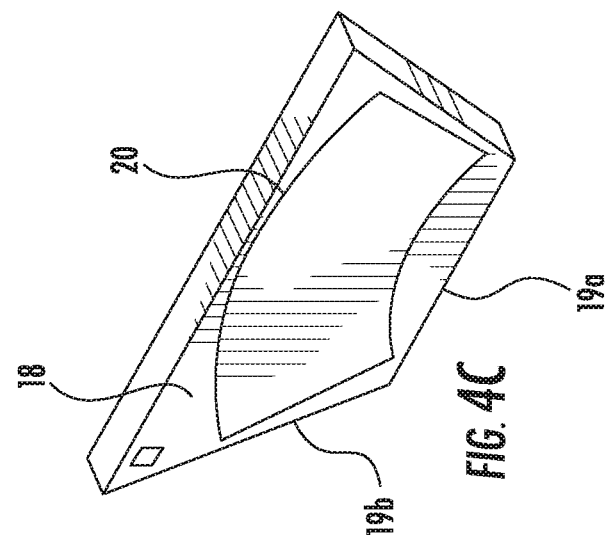
FIGS. 4A, 4B, and 4C are end, plan and perspective views, respectively, of a trapezoidal chip having a photodiode light sensor according to the teachings of the present disclosure.
Figure 4B:
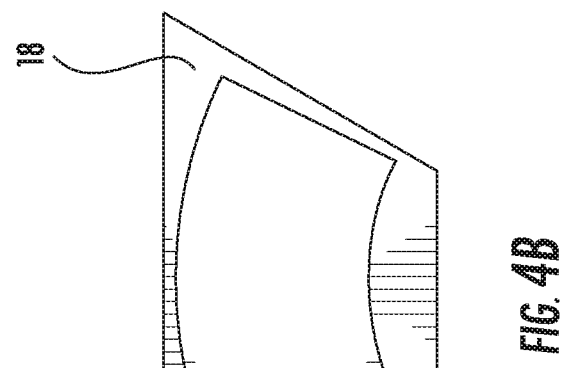
Figure 4A:
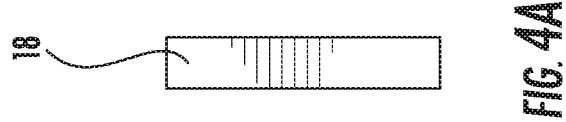

As depicted in FIGS. 2 and 3, one embodiment of the light detector 16 comprises at least one trapezoidal chip 18 mounted on a printed circuit board (PCB) 21, the at least one trapezoidal chip having at least one light sensor 20 thereon for receiving light rays emitted from the light source 14. As used herein, the term "trapezoidal" excludes a rectangle or square. The trapezoidal chip 18 defines at least a first edge 19a and a second edge 19b. As depicted in FIGS. 4A-4C, an angle between the first edge 19a and the second edge 19b is approximately 120 degrees. In one embodiment, the angle between the first edge 19a and the second edge 19b is approximately 117 degrees. Other suitable angles resulting in trapezoidal chips are considered to be within the scope of the present disclosure.

The PCB 21 is used both to mount the silicon sensors thereon, and to facilitate motor and LED connection. The PCB 21 defines an aperture 17 through which the shaft 12 extends. The PCB 21 may be a four-layer circuit board, to permit the connections that are needed for the silicon sensor chips and a motor. By way of non-limiting example, the circuit board thickness can be between 0.050 inches and 0.065 inches, and made from standard PCB material such as FR4. In one manufactured unit, 0.040 inches was used. To facilitate desirable quality connections, any exposed pads on the circuit board are preferably gold (whether immersion gold or nickel-gold) or of a material having equivalent beneficial features. Again by way of non-limiting example, a solder mask used on the circuit board is a Black Matte finish, so that any stray light produced by the LED is effectively absorbed by the solder mask. A legend or silk screen layer for the PCB is optional.

With continued reference to FIGS. 2 and 3, an embodiment of a light detector 16 includes a first number of segmented light sensors 20 mounted to a printed circuit board (PCB) 21 and disposed in pairs about an axis, each pair comprising one "A" detector element 28 and one "B" detector element 30, the pairs disposed so that each "A" detector element 28 is circumferentially positioned between two "B" detector elements 30 and each "B" detector element 30 is positioned between two "A" detector elements 28. Counterclockwise sensors are herein referred to as "Sensor A" sensors and clockwise sensors are referred to as "Sensor B" sensors. In one embodiment, the first number of segmented light sensors 20 comprises four light sensors. The PCB 21 may electrically connect both of the "A" sensors 28 together (in parallel) and separately, both of the "B" sensors 30 together (in parallel), ultimately delivering only an "A" output and a "B" output along with a common output.

The overall position sensor and photodiodes are used in a Photo Voltaic mode. Essentially the "A" sensors 28 are amplified with a simple inverting op-amp, and "B" sensors 30 are amplified with a separate op-amp. The optical sensor thus provides a differential output, which works well for measuring the rotational position of the shaft 12. It is of interest to note that Photoconductive mode may also be used with proper biasing, so although the implementation herein described by way of example favors use of the photovoltaic mode, this is not intended to be a limitation.

In one embodiment (not shown), the light blocker 22 includes a second number of opaque, substantially equal-surface-area elements 24 rotatable with the shaft 12, the second number equal to one-half of the first number, wherein a radial extent of the light blocker elements 24 is at least equal to a radial extent of the light sensors 20. An example of this type of rotary position detector configuration is depicted and described in U.S. Pat. No. 8,508,726, the entirety of which is incorporated by reference. Another example of a rotary position detector is depicted and described in U.S. Pat. No. 7,688,432, the contents of which are also incorporated by reference. The light blocker 22 may comprise a plurality of openings, each opening positioned between adjacent light blocker elements 24. In certain exemplary embodiments utilizing the trapezoidal chips as herein described, the angular subtense of each of the light blocker openings is at least as great as the angular subtense of the light sensors 20.

Embodiments may further comprise a circuit operable with the signal connection 26 for measuring signals from the "A" detectors 28 and the "B" detectors 30 relating to an amount of light impinging thereon, wherein a difference between the "A" detector signal and the "B" detector signal is related to an angular position of the shaft 12. Although the embodiments disclosed herein all show a single active area on each chip, such is not intended to be a limitation, and it is possible that each chip may have more than one active area. For example, it is possible that each chip may have both "Sensor A" and "Sensor B" on a single chip. This would reduce the amount of rotation that could be sensed, but could be desirable for certain applications.

In the embodiments depicted in FIGS. 1-3, the segmented light sensors 20 are generally defined within a plane perpendicular to the axis. In other embodiments, the light sensors may be parallel to the axis. The segmented light sensors 20 may have an arcuate sector shape. In another embodiment, the arcuate sector shape comprises a substantially toroidal shape.

With continued reference to FIGS. 1-3, the light sensors 20 include a light sensor material responsive to light, such as a photodiode, wherein a linear increase in light per unit area impinging thereon causes a substantially linear increase in an output signal. Over the years photodiodes have been tested whose capacitance was quite low—on the order of a few tens of picofarrad each, as well as photodiodes whose capacitance is much higher—on the order of hundreds of picofarrad each. The photodiodes having low capacitance are said to be based on high ohm-centimeter silicon material such as around 2000 ohm-centimeters. On datasheets, these silicon photodiodes are claimed by manufacturers to produce "higher noise" in photovoltaic applications. However, in a computer analysis, it was found that capacitance really plays a dominant role in overall position sensor noise because of how the capacitance manifests itself with the signal amplifier. Therefore, a sensor material that offers low device capacitance may be desirable.

Figure 5:
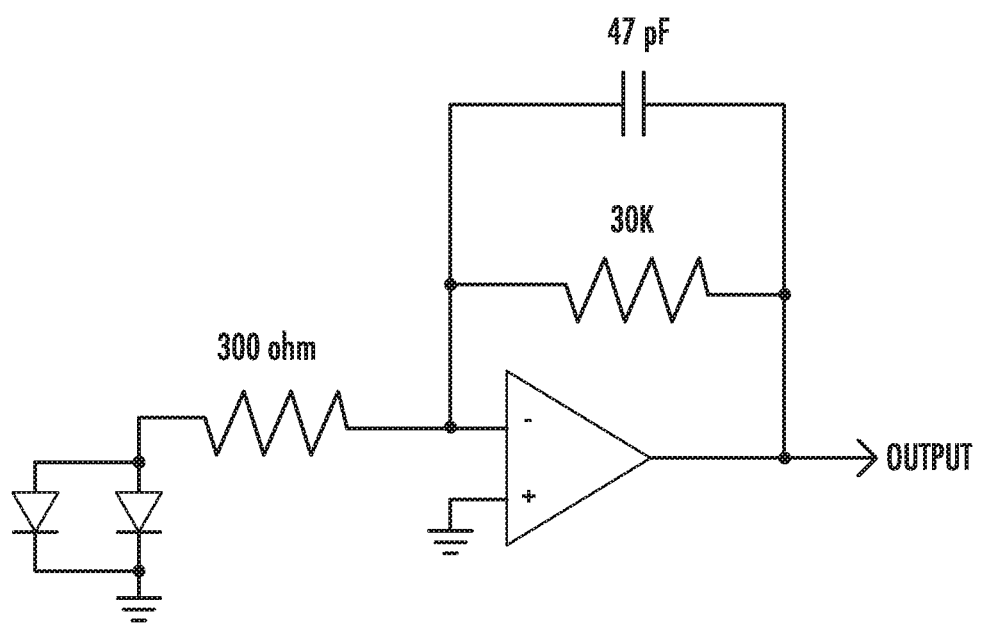
FIG. 5 is a schematic circuit diagram according to the teachings of the present invention including a parallel connection of photodiodes.

Certain silicon photodiodes used in photovoltaic applications are amplified using a simple op-amp, and have a direct connection from the photodiode to the op-amp. However, according to the teachings of the present disclosure, a small resistor may be connected to the photodiode and the op-amp, as illustrated with reference to FIG. 5. The circuit diagram of FIG. 5 shows the paralleled connection between individual photodiodes (i.e. two "Sensor A" in parallel) as well as typical amplifier component values.

The resistor between the photodiode and op-amp is placed there to "isolate" the photodiode capacitance (and also any "cable capacitance" between the photodiode and amplifier board) from the op-amp. This tends to reduce noise that would otherwise be produced by the op-amp. This works desirably well to reduce noise. However, this resistor does effectively allow the photodiode to develop a small and varying voltage across it during sensor operation. Component values are selected that limit this voltage to around 0.1 to 0.2 volts. It has been determined that if this voltage gets too high (for example around 0.5 volts or so), the linearity of the sensor is negatively impacted because eventually the "diode" becomes forward biased. Experiments have shown that some photodiodes will allow this voltage to rise to around 1 volt before any noticeable linearity affects come into play.

Figure 6:
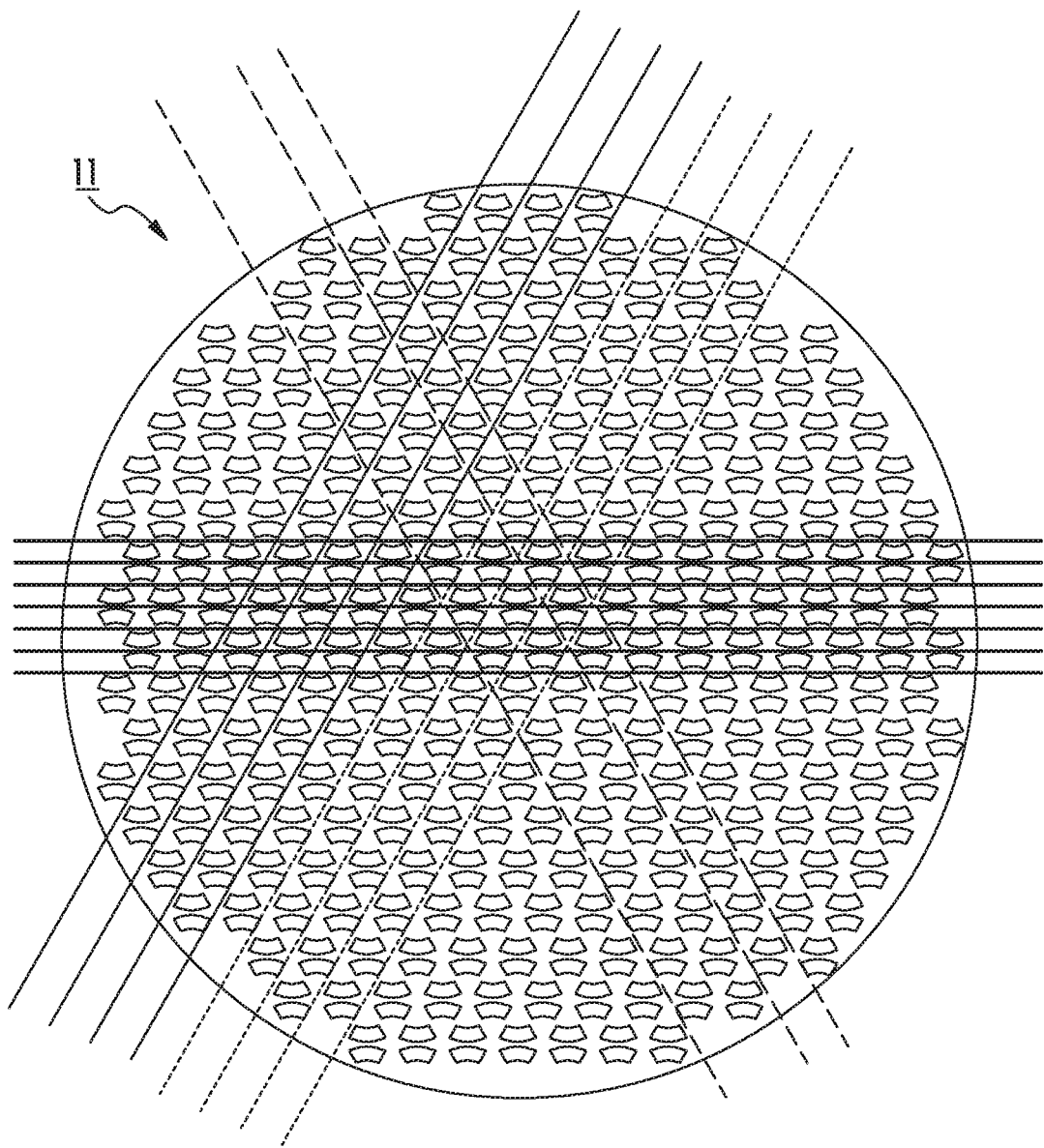
FIG. 6 is an illustration of a wafer including photodiode light sensors arranged according to the teachings of the present disclosure.

With reference now to FIG. 6, embodiments of the present disclosure also include a method for manufacturing a light detector 16 operable with a rotary position detector 10, the method comprising:

providing a wafer having a plurality of light sensors;

cutting the wafer by performing at least one cut at a first angle counterclockwise relative to horizontal (dashed lines);

cutting the wafer by performing at least one cut at a second angle clockwise relative to horizontal (dotted lines); and cutting the wafer by performing at least one horizontal cut (solid lines), wherein the cutting results in at least one trapezoidal chip having at least one light sensor;

mounting the at least one trapezoidal chip on a printed circuit board; and positioning the light detector in spaced relation to a light source for assisting with a measuring of a rotary position of a shaft.

In one embodiment, the first and second angles are greater than or less than about 120 degrees. In another embodiment, the first and second angles are about 117 degrees. In some embodiments, there are twice as many horizontal cuts as there are diagonal cuts.

By rotating a dicing saw so that it operates at either about 117 degree or about 120 degree angles, instead of the usual 90-degree angles, it is possible to make chips that are trapezoidal instead of rectangular. During the dicing process, the chips take on a triangular shape. But after the final cut, small triangular "waste pieces" are eventually removed, leaving the trapezoidal chip itself. The use of trapezoidal chips permits a larger hole, or aperture 17, in the PCB through which the shaft 12 may extend.

While herein describing how about 117-degree or about 120-degree cuts may be performed, this is not intended to be a limitation. Other angles may also be used to optimize wafer utilization, the amount of active area of the photosensitive material, and the size of the hole in the center of the PCB where the motor shaft comes through. As long as a trapezoidal shape results, the embodiments may be used.

Moreover, when comparing the trapezoidal approach of the present invention to the prior-art approach described in U.S. Pat. No. 7,688,432 that uses five-sided chips, the prior-art approach requires the total silicon area to be much larger than would be required for the new trapezoidal approach as herein described for embodiments of the invention. The trapezoidal approach allows for silicon usage very similar to the standard prior art square-chip approach, such as that described in U.S. Pat. No. 5,844,673, but has the benefit of being able to have a larger size hole in the middle of the circuit board for a shaft to come through.

To evaluate the performance of the present invention with prior art approaches discussed here, one should compare the size of the motor shaft that attaches to light blocker 22, and the hole in the circuit board through which the motor shaft must pass. The most popular United States-based manufacturer of prior-art galvanometers uses a shaft size of 0.060 inches passing through a hole in the circuit board having a diameter of 0.078 inches. A China-based galvanometer manufacturer uses a shaft size of 0.070 inches passing through a hole in the circuit board having a diameter of 0.080 inches. By comparison, galvanometers being manufactured by the inventor and using the teachings of the present disclosure use a shaft size of 0.0935 inches passing through a hole in the circuit board having a diameter of 0.112 inches. In fact the shaft size can safely be increased to around 0.100 inches.

Since the stiffness of a shaft is proportional to the fourth power of its diameter, galvanometers using a shaft diameter of 0.0935 inches are 3.18 times as stiff as those having a diameter of 0.070 inches, and almost 6 times as stiff as those having a diameter of 0.060 inches (as long as the length of the shaft is the same). The stiffer shaft is highly desirable in galvanometer applications since it pushes torsional resonant frequency higher and reduces positional uncertainty.

Of course it is possible to increase the diameter of the hole in the circuit board of prior art position sensors, allowing a larger shaft to pass through. However, doing so would necessitate that the dimensions of the silicon sensor chips change as well. Changing the inner dimensions of these chips (those dimensions closest to the aperture 17 in the printed circuit board 21) demands that either the sensor angle be reduced, or the active area of the sensor to be reduced—lowering signal-to-noise ratio. Changing the outer dimension of the chips demands that the diameter of the light blocker 22 be increased, which increases inertia and lowers torsional and bending-mode resonances of the position sensor. Any of these changes results in a reduction in overall position sensor performance.

Manufacturing a position sensor using trapezoidal chips according to the teachings of the present disclosure allows for the hole size in the circuit board to be increased dramatically, which ultimately dramatically pushes bending- and torsional-mode resonant frequencies higher, while simultaneously reducing positional uncertainty. These benefits are accrued while not sacrificing position sensing angle, signal-to-noise ratio, or increased inertia. Moreover, wafer utilization (in terms of the number of sensor chips that can be made from a single wafer) for the trapezoidal chip approach of the present invention is similar to that of the commonplace and prior-art rectangular-chip approach, thus the monetary cost of implementing the new sensor of the present invention is also similar.

Although the invention has been described relative to various selected embodiments herein presented by way of example, there are numerous variations and modifications that will be readily apparent to those skilled in the art in light of the above teachings. It is to be understood that, within the scope of claims supported by this specification, the invention may be practiced other than as specifically described.

What is claimed is:

1. A light detector comprising a trapezoidal chip having an arcuate light sensor positioned thereon.

2. A light detector comprising segmented light sensors disposed in pairs, each pair comprising one "A" detector element and one "B" detector element, at least one of the segmented light sensors positioned on a trapezoidal chip.

3. The light detector according to claim 2, wherein the pairs are disposed so that each "A" detector element is positioned between two "B" detector elements and each "B" detector element is positioned between two "A" detector elements.

4. The light detector according to claim 2, further comprising a circuit operable with a signal connection for measuring signals from the "A" detector elements and the "B" detector elements relating to an amount of light impinging thereon.

5. The light detector according to claim 2, wherein the segmented light sensors are generally defined within the same plane.

6. The light detector according to claim 2, wherein each of the segmented light sensors comprises an arcuate sector shape.

7. The light detector according to claim 2, wherein each of the segmented light sensors comprises a substantially toroidal shape.

8. The light detector according to claim 2, wherein the segmented light sensors comprises four light sensors.

9. The light detector according to claim 2, wherein the segmented light sensors comprise a light sensor material responsive to light, and wherein a linear increase in light per unit area impinging thereon causes a substantially linear increase in output signal.

10. The light detector according to claim 2, wherein the trapezoidal chip defines a first edge and a second edge, wherein an angle between the first edge and the second edge is about 120 degrees.

11. The light detector according to claim 2, wherein the trapezoidal chip defines a first edge and a second edge, wherein an angle between the first edge and the second edge is about 117 degrees.

* * * * *